United States Patent
Mattes et al.

(10) Patent No.: US 6,687,575 B2
(45) Date of Patent: Feb. 3, 2004

(54) DEVICE FOR CLASSIFYING VARIOUS DRIVING MANOEUVERES

(75) Inventors: Bernhard Mattes, Sachsenheim (DE); Juergen Kissner, Schwieberdingen (DE); Walter Wottreng, Takasaki (JP); Hans-Peter Lang, Ludwigsburg (DE); Kosmas Knoedler, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 10/018,918

(22) PCT Filed: Apr. 5, 2001

(86) PCT No.: PCT/DE01/01321
§ 371 (c)(1), (2), (4) Date: Apr. 11, 2002

(87) PCT Pub. No.: WO01/79037
PCT Pub. Date: Oct. 25, 2001

(65) Prior Publication Data
US 2002/0135167 A1 Sep. 26, 2002

(30) Foreign Application Priority Data
Apr. 19, 2000 (DE) .......................................... 100 19 418

(51) Int. Cl.$^7$ ............................ B60R 21/23; G06F 7/00
(52) U.S. Cl. .............................. 701/1; 701/72; 701/45; 180/282; 280/5.506
(58) Field of Search ................................ 701/1, 45, 96, 701/72; 180/197, 282; 340/440; 280/5.506, 5.507, 5.513

(56) References Cited

U.S. PATENT DOCUMENTS

| | | | |
|---|---|---|---|
| 5,610,575 A | | 3/1997 | Gioutsos ..................... 340/429 |
| 6,038,495 A | | 3/2000 | Schiffmann .................... 301/1 |
| 6,055,472 A | * | 4/2000 | Breuning et al. ............. 701/45 |
| 6,170,594 B1 | * | 1/2001 | Gilbert ....................... 180/282 |
| 6,192,305 B1 | * | 2/2001 | Schiffmann .................. 701/45 |

FOREIGN PATENT DOCUMENTS

DE         197 44 083        4/1999

* cited by examiner

Primary Examiner—Tan Q. Nguyen
(74) Attorney, Agent, or Firm—Kenyon & Kenyon

(57) ABSTRACT

The system is intended to have the ability to differentiate between various characteristic driving maneuvers, so that a special triggering algorithm of restraint devices can be initiated for each class of driving maneuvers. This system has an acceleration sensor that measures the acceleration of the vehicle in the direction of its vertical axis. A classifier is provided which, when the measured acceleration is above a threshold of 1 g, decides on a driving maneuver in which the vehicle lifts upward on one side, as when driving on a ramp. If the measured acceleration is between 0 g and 1 g, then the classifier decides on a driving maneuver during which the vehicle tips downward on one side, as when driving on a slope.

4 Claims, 1 Drawing Sheet

DEVICE FOR CLASSIFYING VARIOUS DRIVING MANOEUVERES

BACKGROUND INFORMATION

German Published Patent Application No. 197 44 083 describes a system for detecting an imminent rollover of a vehicle. To that end, a critical rotational rate of the vehicle about its center of gravity is ascertained as a function of the measured angle of inclination of the vehicle. As can be gathered from this document, the critical rotational rate corresponds to a rotational energy of the vehicle which just exceeds the potential energy of the vehicle. Namely, if this is the case, that is to say, if the critical rotational rate is reached, then the vehicle will assuredly roll over. A prognosis should be made early as to whether the vehicle will roll over because of a specific driving maneuver, so that safety devices (e.g. airbags, rollover bars, etc.) existing in the vehicle can be triggered in time prior to the actual rollover. A rollover of a vehicle is very probable in the case of a driving maneuver in which, first of all, the center of gravity of the vehicle is raised by a specific height in the gravitational field of the earth, for example, when driving on a ramp, and secondly, the vehicle still has ground contact. During such driving on a ramp, the vehicle experiences a conversion of rotational energy into potential energy. So-called slope driving, during which the vehicle is traveling on a slope and thereby is on a slant, represents another driving maneuver which leads with high probability to a rollover of the vehicle. Different from driving on a ramp, in response to tilting due to a slope, potential energy is converted into rotational energy; namely, the vehicle tips down the slope without outer influences (apart from the gravitational force). A similar behavior as when driving on a ramp is exhibited by vehicles during extreme obstacle-avoidance maneuvers (e.g. fishhook, moose-avoidance test) or during lateral drifting with abrupt change of the friction coefficients (curb/soil tripped rollover). These two different types of driving maneuvers can lead to rollovers which give rise to a basically different movement of the passengers in the vehicle. To provide optimal protection to the passengers in all such cases, it is necessary to react to the different types of rollovers with correspondingly adapted triggering operations for restraint devices.

SUMMARY OF THE INVENTION

An object of the present invention is to specify a system for classifying various driving maneuvers that can lead to the rollover of a vehicle, which differentiates between various characteristic driving maneuvers so that a special triggering algorithm for restraint devices can be initiated for the driving-maneuver class determined in each case by the system.

The indicated objective is achieved in that an acceleration sensor is provided which measures the acceleration of the vehicle in the direction of its vertical axis, and that when the measured acceleration is above a threshold of 1 g, a classifier decides on a driving maneuver in which the vehicle lifts upward on one side as when driving on a ramp, and that in response to an acceleration between 0 g and 1 g, the classifier decides on a driving maneuver in which the vehicle tilts downward on one side as when driving on a slope.

According to the present invention, a differentiation is possible between two fundamental classes of driving maneuvers, namely as when driving on a ramp and when driving on a slope. These two driving-maneuver classes differ due to an opposite direction of their center-of-gravity acceleration. When driving on a ramp, the center-of-gravity acceleration is directed in the positive direction of the vertical axis of the vehicle, and when driving on a slope, is directed in the negative direction of the vertical axis of the vehicle. The passengers experience very different movements in response to both driving-maneuver classes which require different triggering of restraint devices in the vehicle.

It is expedient that the classifier does not implement a threshold-value decision based on the measured acceleration for deciding the driving-maneuver class until a rotational rate of the vehicle about its longitudinal axis, measured by a rotation-rate sensor, exceeds a predefined threshold.

DETAILED DESCRIPTION

Figure 1:
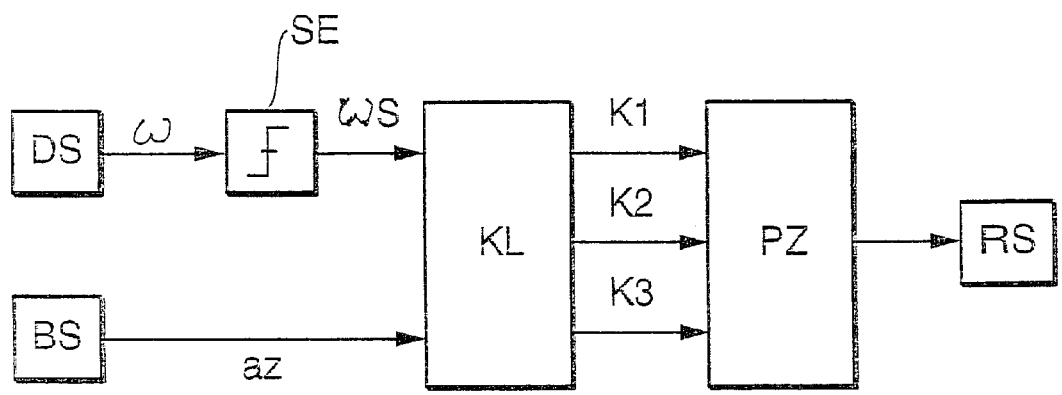
FIG. 1 shows a block diagram of a system for classifying various driving maneuvers.

As FIG. 1 shows, in order to be able to differentiate three different classes K1, K2 and K3 of driving maneuvers, an acceleration sensor BS is provided which measures acceleration az in the direction of the vertical axis of a vehicle. It is a so-called low-g acceleration sensor. Measured acceleration signal az is supplied to a classifier KL. In principle, this classifier KL is a threshold-value discriminator.

Figure 2:
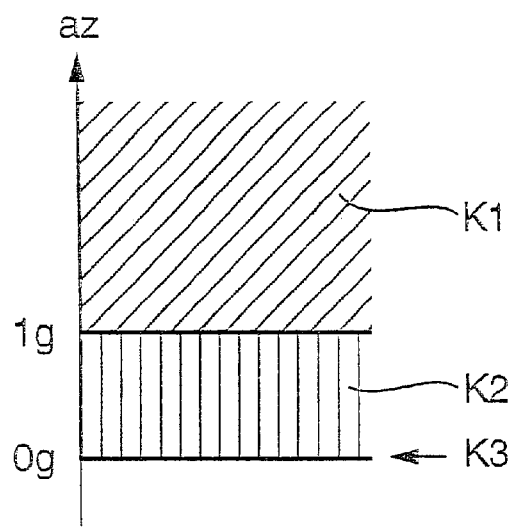
FIG. 2 shows a classification of the driving maneuvers as a function of the acceleration of the vehicle in the direction of its vertical axis.

FIG. 2 shows how classifier KL carries out the classification into K1, K2 and K3 as a function of acceleration az in the direction of the vertical axis of the vehicle. Namely, if an acceleration az is measured which above a threshold of 1 g—where g is the gravitational acceleration—then classifier KL decides on a driving-maneuver class K1 in which the vehicle lifts upward on one side. Such a driving maneuver occurs when driving on a ramp or during a lateral drift of the vehicle with abrupt change of the friction coefficient (curb/soil tripped rollover) or during extreme obstacle-avoidance maneuvers (e.g. fishhook, moose-avoidance test).

If, through threshold-value decision, it is determined by classifier KL that measured acceleration az in the direction of the vertical axis of the vehicle is between 0 g and 1 g, it then decides upon a vehicle-maneuver class K2 during which the vehicle tips downward on one side, as is the case when driving on a slope.

If classifier KL determines an acceleration az in the range of 0 g, then it decides on a driving-maneuver class K3 that corresponds to a free fall of the vehicle, which is present when the vehicle lifts off completely from the ground.

In the range of a measured acceleration az of 1 g, one can speak of a normal drive, thus, when the vehicle is moving on a flat roadway without an abrupt lift or drop on one side.

Classifier KL receives a start signal ωs for the threshold-value decision based on measured acceleration az in the direction of the vertical axis of the vehicle. The result of this start signal cos for classifier KL is that acceleration az is not subjected to a threshold-value decision until rotational rate ω about the longitudinal axis of the vehicle, measured by a rotational-rate sensor DS, exceeds a specific threshold value ωs determined by a threshold-value discriminator SE. For only if the vehicle exhibits a certain rotational rate ωs about its longitudinal axis does the probability exist that a rollover can occur at all. Only then does it makes sense for classifier KL to assign the instantaneous driving behavior of the vehicle to a driving-maneuver class K1, K2 or K3 which will lead to a characteristic rollover behavior of the vehicle.

Driving-maneuver class K1, K2 or K3 determined by classifier KL is transmitted to a processor PZ. Depending on the driving-maneuver class transmitted, a specific triggering algorithm for restraint devices (e.g. airbags, belt tighteners, rollover bars, etc.) is initiated in this processor PZ. For in response to each driving-maneuver class K1, K2 or K3 and the special rollover behavior of the vehicle resulting therefrom, a different passenger movement results to which there should be a reaction with a special triggering configuration (instant and sequence) of restraint devices.

What is claimed is:

1. A system for classifying various driving maneuvers which can lead to a rollover of a vehicle, comprising:

an acceleration sensor for measuring an acceleration of the vehicle in a direction of a vertical axis thereof; and a classifier, wherein:

when the measured acceleration is above 1 g, the classifier decides on a first driving maneuver in which the vehicle lifts upward on one side, and in response to the measured acceleration being between 0 g and 1 g, the classifier decides on a second driving maneuver in which the vehicle tips downward on one side.

2. The system according to claim 1, wherein:

the first driving maneuver resembles as when driving on a ramp, and the second driving maneuver resembles as when driving on a slope.

3. The system according to claim 1, wherein:

in response to the measured acceleration being approximately 0 g, the classifier decides on a third driving maneuver that corresponds to a free fall of the vehicle.

4. The system according to claim 1, further comprising:

a rotational-rate sensor, wherein:

the classifier does not implement a threshold-value decision based on the measured acceleration until a rotational rate of the vehicle about a longitudinal axis thereof, measured by the rotational-rate sensor, exceeds a predefined threshold.

* * * * *

UNITED STATES PATENT AND TRADEMARK OFFICE
CERTIFICATE OF CORRECTION

PATENT NO. : 6,687,575 B2
DATED : February 3, 2004
INVENTOR(S) : Bernhard Mattes et al.

It is certified that error appears in the above-identified patent and that said Letters Patent is hereby corrected as shown below:

<u>Title page, Item [54] and Column 1, line 2,</u>
Title, change "MANOEUVERES" to -- MANEUVERS --

Signed and Sealed this

Fourth Day of January, 2005

JON W. DUDAS
*Director of the United States Patent and Trademark Office*